US006102015A

United States Patent [19]

Tsuyuki et al.

[11] Patent Number: 6,102,015

[45] Date of Patent: Aug. 15, 2000

[54] DIAGNOSTIC DEVICE AND METHOD FOR EXHAUST GAS RECIRCULATION SYSTEM

[75] Inventors: Takeshi Tsuyuki; Katsuhiko Kawamura, both of Kanagawa, Japan

[73] Assignee: Nissan Motor Co., Ltd., Yokohama, Japan

[21] Appl. No.: 09/229,308

[22] Filed: Jan. 13, 1999

[30] Foreign Application Priority Data

Jan. 14, 1998 [JP] Japan .................................. 10-005568

[51] Int. Cl.[7] .............................. F02M 25/07; G06F 17/00

[52] U.S. Cl. ...................... 123/568.16; 701/107; 701/114

[58] Field of Search ............................... 123/568.16, 676; 701/107, 108, 114

[56] References Cited

U.S. PATENT DOCUMENTS 3,779,222 12/1973 Lorenz ............................... 123/568.16
4,164,206 8/1979 Toelle ................................ 123/568.27
4,715,348 12/1987 Kobayashi et al. ..................... 123/571
4,793,318 12/1988 Tsurusaki ............................... 123/571
4,825,841 5/1989 Norota et al. .......................... 123/571
4,870,941 10/1989 Hisatomi ................................ 123/676
4,870,942 10/1989 Shibata et al. .......................... 123/676
4,879,986 11/1989 Sakamoto ................................ 123/676
5,014,203 5/1991 Miyazaki et al. .................. 123/568.16
5,209,212 5/1993 Viess et al. ......................... 123/568.16
5,239,971 8/1993 Uchinami ........................... 123/568.16
5,303,168 4/1994 Cullen et al. ........................... 700/299
5,727,533 3/1998 Bidner et al. ...................... 123/568.16

FOREIGN PATENT DOCUMENTS 63-261134 10/1988 Japan .

*Primary Examiner*—Henry C. Yuen
*Assistant Examiner*—Arnold Castro
*Attorney, Agent, or Firm*—Foley & Lardner

[57] ABSTRACT

A diagnostic device and method for an exhaust gas recirculation system achieves a prompt diagnosis without reducing accuracy. The diagnosis of an exhaust gas recirculation system, which is carried out based on an EGR temperature and an operating signal for operating an EGR control valve, is prevented when the EGR temperature is greater than a predetermined temperature, except when a rising rate of the EGR temperature is greater than a predetermined value.

17 Claims, 6 Drawing Sheets

DIAGNOSTIC DEVICE AND METHOD FOR EXHAUST GAS RECIRCULATION SYSTEM

CROSS REFERENCE TO RELATED APPLICATION

The entire contents of Japanese application Tokugan Hei 10-5568, with a filing date of Jan. 14, 1998 in Japan, is hereby incorporated by reference.

DESCRIPTION OF RELATED ART

The invention is directed to a diagnostic device for an exhaust gas recirculation (EGR) system. In an internal combustion engine, an exhaust gas recirculation system for decreasing nitrogen oxides (NOx) in exhaust gas recirculates a part of the exhaust gas into intake air.

Basically, the exhaust gas recirculation system includes an EGR passage for recirculating a part of the exhaust gas from an exhaust passage to an intake passage; an EGR control valve installed in the EGR passage; and a control unit for controlling the EGR control valve in accordance with an engine operation conditions.

With such an exhaust gas recirculation system, the carbon in the exhaust gas deposits on the EGR control valve with time, therefore, there is a possibility that the EGR control valve may get stuck. If the EGR control valve fails to operate as result of being stuck, a reduction of NOx in the exhaust gas cannot be achieved. Therefore, it is preferable to diagnose the exhaust gas recirculation system and inform a vehicle operator of its malfunction.

In order to diagnose the malfunction in the exhaust gas recirculation system, as discussed in Japanese Patent Kokai No. 63-261134, a temperature sensor is provided in the EGR control valve, and the malfunction in the exhaust gas recirculation system is determined by using the characteristics of the temperature rising when the exhaust gas recirculation is executed. In other words, it is determined that a malfunction has occurred in the exhaust gas recirculation system, when the temperature at the EGR control valve is lower than a predetermined temperature even though the exhaust gas recirculation has executed.

Also, to prevent misdiagnosing, it is prohibitive to diagnose the exhaust gas recirculation system until a predetermined time has elapsed from a start of the engine. The predetermined time, which prevents the diagnosis of the exhaust gas recirculation system when the engine is in a warming up condition, is corrected based on a coolant temperature at the engine start time. Additionally, to prevent mis-diagnoses, it is prohibitive to diagnose the exhaust gas recirculation system when an intake air temperature is higher than a predetermined air temperature.

BRIEF SUMMARY OF THE INVENTION

The temperature of the EGR control valve rises when the engine is operated in an idling condition continuously with the vehicle stopped, even if the exhaust gas recirculation is not being executed. In other words, the temperature of the EGR control valve rises regardless of the coolant temperature at the engine start time. Moreover, since the temperature in the engine room is high because of the heat of the engine when the engine is re-started after the idling condition with the vehicle stopped or after a high load condition, the temperature sensor of the EGR control valve might detect a high temperature even if the predetermined time from the engine start has already elapsed. Therefore, even if diagnosis of the exhaust gas recirculation system is prohibitive for a predetermined time corresponding to the coolant temperature at the engine start, there is a possibility to mis-diagnose as the exhaust gas recirculation system functions normally, though a malfunction occurs in the EGR control valve, for example, the EGR control valve maintains a close position and the recirculation of exhaust gas is not executed as intended.

Additionally, the temperature of the EGR control valve does not decrease when the engine is operated in an idling condition continuously with the vehicle stopped or when the vehicle is driven in a low speed, for example 20 Km/h or less. Therefore, if it is prohibitive to diagnose when the intake air temperature is higher than the predetermined temperature, the diagnosis is prohibited as long as the intake air temperature maintains high. In other words, the result of the diagnosis cannot be obtained for a long time, even if the EGR control valve does not perform properly.

In view of these considerations, it is an object of the invention to provide a diagnosis device for an exhaust gas recirculation system of an engine, which can achieve diagnosis promptly without reducing the accuracy.

In order to achieve the above object, the invention provides a diagnostic device for an exhaust gas recirculation system of an engine. An EGR passage, wherein the EGR passage recirculates exhaust gas from an exhaust passage to an intake passage; an EGR control valve disposed in the EGR passage; an EGR temperature sensor, disposed in the EGR passage, to detect a temperature; and a controller, wherein the controller comprises: a control section generating an operating signal to control the EGR control valve; a calculation section to calculate a rising rate of the temperature; a diagnostic execution section to execute a diagnosis of the exhaust gas recirculation system based on the temperature and the operating signal when the temperature is less than or equal to a predetermined temperature; and a permission section to permit execution of the diagnosis when the rising rate of the temperature is greater than a predetermined value even when the temperature is greater than the predetermined temperature.

Also, the invention provides a diagnostic device for an exhaust gas recirculation system of an engine. An EGR passage, wherein the EGR passage recirculates exhaust gas from an exhaust passage to an intake passage; an EGR control valve disposed in the EGR passage; an EGR temperature sensor, disposed in the EGR passage, to detect a temperature; and a controller, wherein the controller comprises: a control section generating an operating signal to control the EGR control valve; a calculation section to calculate a rising rate of the temperature when the temperature at the engine start is greater than a first predetermined temperature; a diagnostic execution section to execute a diagnosis of an exhaust gas recirculation system based on the temperature and the operating signal, wherein the diagnosis is prevented when the temperature is greater than a second predetermined temperature, and when the temperature at the engine start is greater than the first predetermined temperature, and wherein the first predetermined temperature is greater than the second predetermined temperature; and a permission section to permit execution of the diagnosis when the rising rate of the temperature is greater than a predetermined value even when the temperature is greater than the second predetermined temperature.

The diagnosis determines a malfunction, when the temperature is less than a test temperature though the operating signal to open the EGR control valve is generated. The test temperature is greater than the first predetermined temperature.

The diagnostic execution section prohibits the diagnosis until a predetermined time elapses when the temperature is less than or equal to the second predetermined temperature.

Also, the invention provides a method for diagnosis of an exhaust gas recirculation system of an engine. The method includes detecting a temperature in the EGR passage; generating an operating signal to control the EGR control valve; calculating a rising rate of the temperature when the temperature at the engine start is greater than a first predetermined temperature; executing a diagnosis of an exhaust gas recirculation system based on the temperature and the operating signal, wherein the diagnosis is prevented when the temperature is greater than a second predetermined temperature, and when the temperature at the engine start is greater than the first predetermined temperature, and wherein the first predetermined temperature is greater than the second predetermined temperature; and permitting an execution of the diagnosis when the rising rate of the temperature is greater than a predetermined value even when the temperature is greater than the second predetermined temperature.

These and other objects and many of the attendant advantages of this invention will be readily appreciated as the same becomes better understood by reference to the following detailed description when considered in connection with the accompanying drawing.

DETAILED DESCRIPTION OF PREFERRED EMBODIMENTS

The invention will now be described by way of preferred embodiments in connection with the accompanying drawings.

Figure 1:
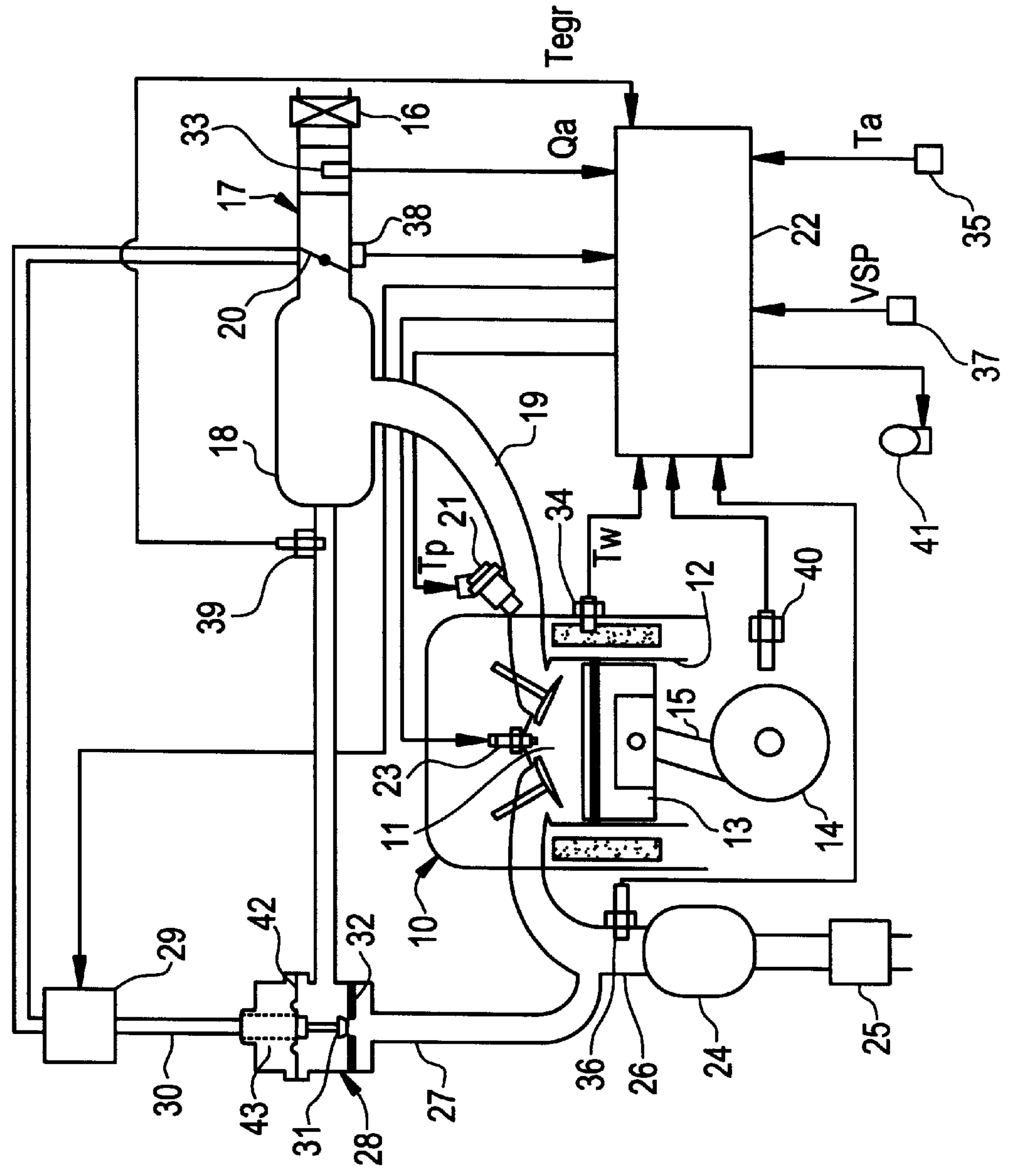
FIG. 1 is a system diagram of an engine embodying the invention.

FIG. 1 is a system diagram showing a gasoline internal combustion engine embodying the invention. Also, the invention can be applied to a diesel engine.

A multi-cylinder engine 10 for a vehicle includes a combustion chamber 11 and a cylinder 12. A piston 13 reciprocates in the cylinder 12. The piston 13 is coupled to a crankshaft 14 through a connecting rod 15 so as to convert the reciprocation of the piston 13 into the rotation of the crankshaft 14.

Intake air is introduced from an air cleaner 16 through an intake passage 17, an intake manifold 18, and an intake port 19 to the cylinder 12. Intake air quantity is controlled by a throttle valve 20, which is provided in the intake passage 17.

A fuel injector 21, which provides fuel into the intake air, is disposed in the intake port 19. Fuel injected from the fuel injector 21 is mixed with intake air so as to form an air-fuel mixture. Instead of disposing the fuel injector 21 in the intake port 19, the fuel injector can be disposed in the cylinder 12 so as to inject fuel directly into the combustion chamber 11. The fuel injector 21 provides fuel when its solenoid receives a fuel injection pulse signal Tp outputted from a control unit 22. The injection amount from the injector 21 is controlled by the control unit 22 so that the air-fuel ratio of the air-fuel mixture in the cylinder 12 coincides with the target air-fuel ratio.

A spark plug 23, for igniting the mixture in the combustion chamber 11, is mounted in the center of the cylinder 12. The spark timing is controlled by the control unit 22 based on engine operating conditions.

The engine 10 rotates by burning the air-fuel mixture. The exhaust gas due to combustion is discharged to the atmosphere through a three-way catalytic converter 24 and a silencer 25 via an exhaust passage 26. The three-way catalytic converter 24 provided for purifying the exhaust gas performs oxidation of hydrocarbon (HC) and carbon monoxide (CO), and reduction of nitrogen oxides (NOx) at the same time under the stoichiometric air-fuel ratio.

An exhaust gas recirculation system includes an EGR passage 27, an EGR control valve 28, and an EGR cut valve 29. The EGR passage 27 recirculates the exhaust gas from the exhaust passage 26 to the intake passage 17. The EGR control valve 28, which is installed in the EGR passage 27, is driven by a negative pressure. The EGR cut valve 29, which controls the negative pressure supplied to the EGR control valve 28 in accordance with a EGR operating signal from the control unit 22, is installed in a negative pressure passage 30 between a source of the negative pressure and the EGR control valve 28. The control unit 22 calculates an exhaust gas recirculation region and outputs an EGR operating signal to the EGR cut valve 29. The exhaust gas recirculation region is calculated based on an engine rotation speed, an engine load, and an engine coolant temperature. When the negative pressure is supplied in a diaphragm 42 of the EGR control valve 28, the valve body 31 lifts from a valve sheet 32 against a tension of a return spring 43. Also, when the negative pressure supply is stopped to the EGR control valve 28, the return spring 43 pushes the valve body 31, and the valve body 31 contacts the valve sheet 32.

The control unit 22, or controller, includes a microcomputer comprised of a CPU, a ROM, a RAM, an AID converter and an input/output interface. The sections described herein are implemented in hardware, software, or a combination of both, in the control unit.

The control unit receives signals from various sensors. These sensors include an air flow meter 33 provided in the intake passage 17 at a position upstream of the throttle valve 20 for detecting an intake air rate Qa; a coolant temperature sensor 34 for detecting a coolant temperature Tw of the engine 10; an atmospheric temperature sensor 35 for detecting an air temperature Ta surrounding the vehicle; an 02 sensor 36 provided in the exhaust passage 26 at a position upstream of the three-way catalytic converter 24 for producing a signal corresponding to the rich/lean composition of the exhaust gas for actual air-fuel ratio determination; a vehicle speed sensor 37 for detecting a vehicle speed VSP; an idle switch 38 positioned to be turned on when the throttle valve 20 is fully closed; and an EGR temperature sensor 39 provided in the EGR passage 27 at a position downstream of the EGR control valve 28 for detecting an EGR temperature Tegr.

The sensors also include an angle sensor 40 for detecting a rotation of the crankshaft 14. The angle sensor 40 produces a reference pulse signal REF and a unit pulse signal POS. The REF is outputted at every 720 degrees In of rotation of the crankshaft 14 (where n is the number of cylinders). For example, in a four-cylinder engine, the REF is output at every 180 degrees of rotation of the crankshaft. The POS is outputted at every 1 degree of rotation of the crankshaft. The control unit 22 calculates an engine rotation Ne based on the signal outputted from the angle sensor 40.

The control unit 22 receives the signals fed thereto from the various sensors and includes a microcomputer built therein for making the calculations described herein such as the amount and timing of fuel injection, the spark timing of the spark plug, the exhaust gas recirculation region, and a diagnosis of the exhaust gas recirculation system.

As discussed previously, the control unit 22 calculates the exhaust gas recirculation region based on the engine rotation speed Ne, the engine load (the engine load corresponds to fuel injection pulse signal Tp), and the coolant temperature Tw. The exhaust gas recirculation has an effect to lower the combustion temperature and decrease the generation of NOx in the exhaust gas. However, the carbon in the exhaust gas might deposit on the EGR control valve 28 with time, also the EGR control valve 28 might rust with time suffering from the moisture in the exhaust gas. Consequently, it is possible that the EGR control valve 28 gets stuck, and the exhaust gas recirculation cannot be executed as intended. Also, it is a possible that the EGR control valve 28 cannot be operated as intended when any malfunction causes in the EGR cut valve 29. Therefore, a warning light 41 is prepared in an operator's instrument panel to inform a vehicle operator of the malfunction in the exhaust gas recirculation system.

Figure 2:
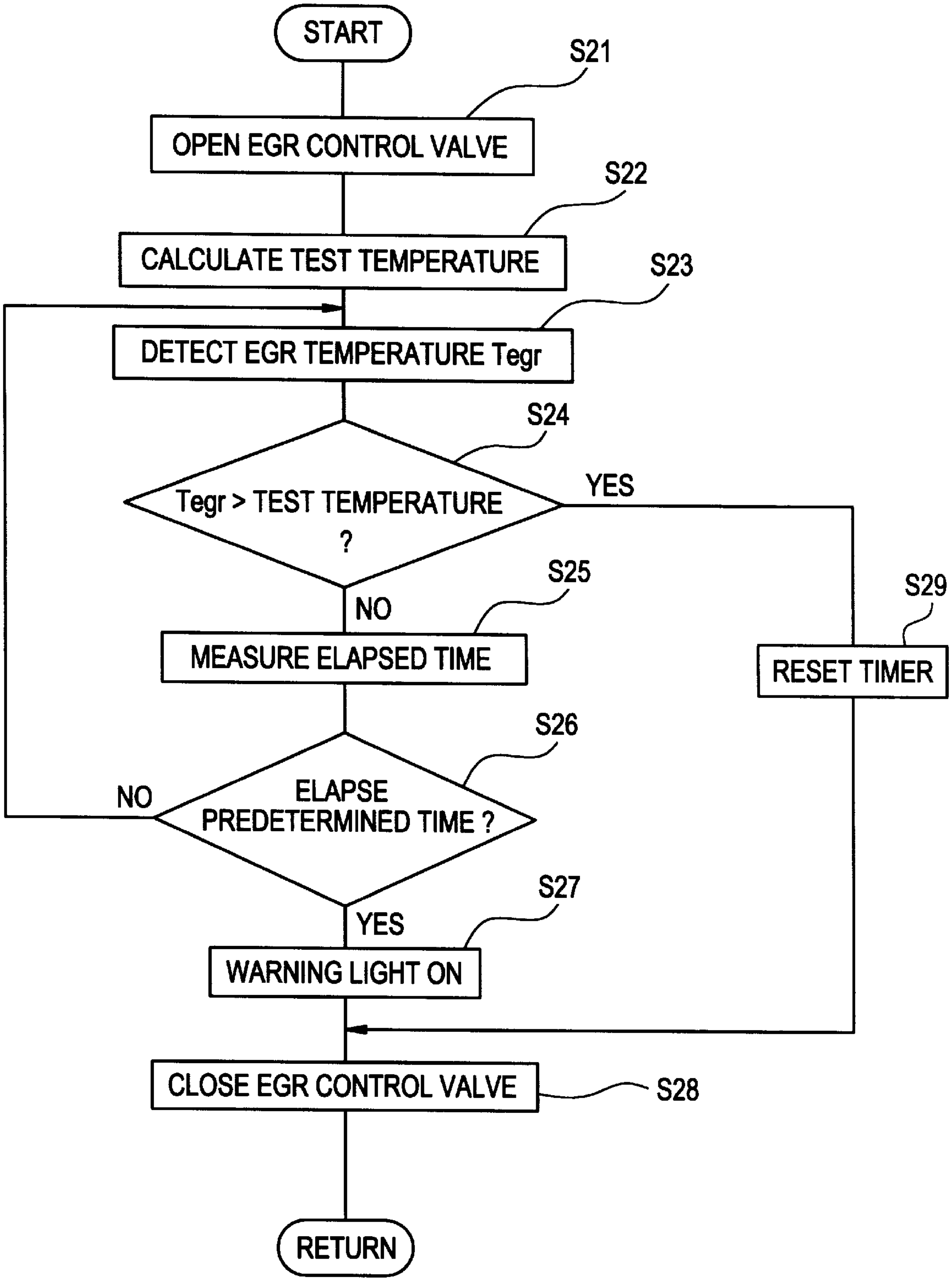
FIG. 2 is a flow diagram of a diagnosis for an exhaust gas recirculation system.

FIG. 2 shows the diagnosis flow diagram, for which the EGR control valve 28 maintains close position and does not work, as for one example. The execution of the diagnosis is permitted when a diagnosis condition is satisfied. The diagnosis condition will be described later by referring to FIG. 3. Also, the diagnosis is executed once every trip. After obtaining the result of the diagnosis, the diagnosis is not executed again until the engine is re-started next time.

First, in a step S21, the EGR control valve 28 is opened temporally for the diagnosis when the engine operating condition is not in the exhaust gas recirculation region.

In a step S22, a test temperature is calculated based on the coolant temperature Tw and/or the air temperature Ta. Also, it is possible to set the test temperature at a fixed value.

In a step S23, a present EGR temperature Tegr is detected by the EGR temperature sensor 39.

In a step S24, it is determined whether or not the EGR temperature Tegr is greater than the test temperature. When the EGR temperature Tegr is less than or equal to the test temperature, the routine proceeds to a step 25, because there is a possibility that exhaust gas might not be circulated to intake air, even though the control unit 22 outputs the signal to open the EGR control valve 28.

In the step S25, while the EGR temperature Tegr is less than or equal to the test temperature, an elapsed time is measured with a timer.

In a step S26, it is determined whether or not the elapsed time has exceeded a predetermined time. In this embodiment, the predetermined time is set, for example, at about 30 seconds. When the elapsed time has not exceeded the predetermined time, the routine returns to the step S23. Conversely, when the elapsed time has exceeded the predetermined time, it is determined that exhaust gas has not circulated to intake air even though the EGR control valve 28 is operated to open. Therefore, the routine proceeds to a step S27.

In the step S27, the warning light 41 is turned on to inform a vehicle operator of the malfunction in the exhaust gas recirculation system.

In a step S28, the EGR control valve 28 is closed if the engine operating condition is not in the exhaust gas recirculation region.

On the other hand, in the step S24, when the EGR temperature Tegr is greater than the test temperature, the exhaust gas is recirculated as intended. Therefore, the routine proceeds to a step S29, and the timer used in the step S25 is reset.

Next, the diagnosis condition, which determines whether or not to permit the execution of the diagnosis, will be described with reference to the flow diagrams.

First Embodiment

Figure 3:
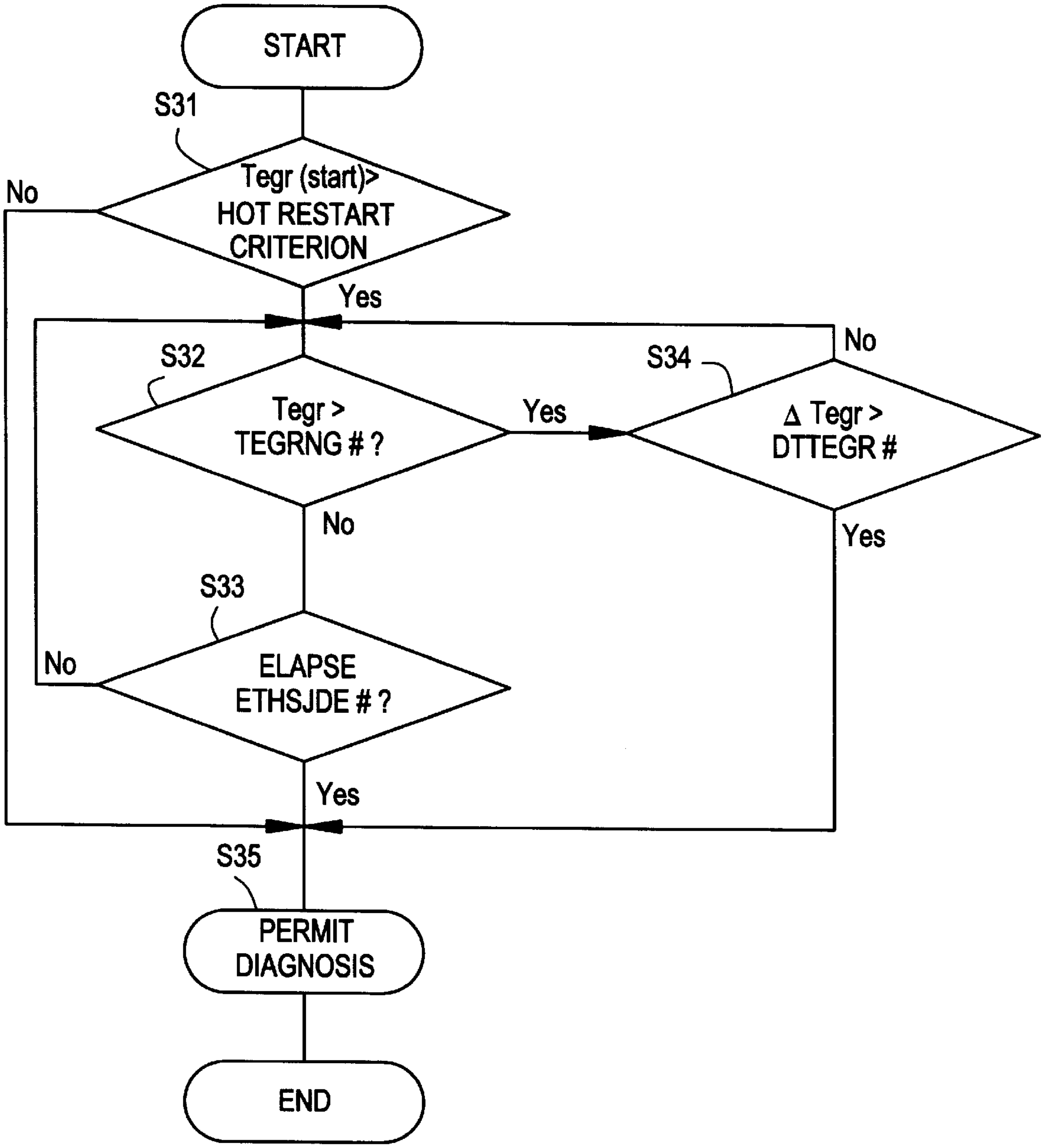
FIG. 3 is a flow diagram used in a first embodiment.

The first embodiment will be described with reference to a flow diagram of FIG. 3.

Figure 6:
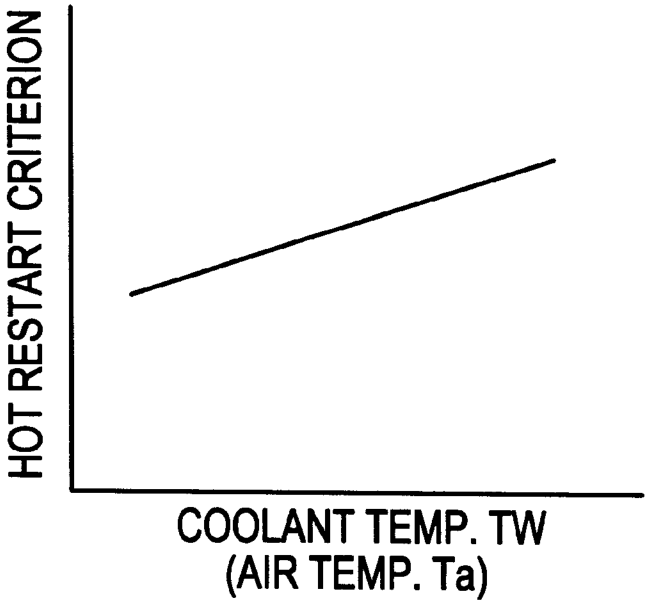
FIG. 6 is a diagram illustrating a hot re-start criterion in relation to a coolant temperature.

First, in a step S31, it is determined whether or not the EGR temperature at engine start Tegr(start) is greater than a hot re-start criterion. When the EGR temperature at engine start Tegr(start) is less than or equal to the hot re-start criterion, the temperature in the engine room is not high enough because of the heat of the engine, i.e., the engine is not re-started immediately after the idling condition with the vehicle stopped or after a high load condition. Therefore, mis-diagnosis does not occur, the routine proceeds to a step S35, and the diagnosis in FIG. 2 is performed. On the other hand, when the EGR temperature at engine start Tegr(start) is greater than the hot re-start criterion, a hot re-start condition exists. In this case, the temperature in the engine room is high, i.e., the engine is re-started after the idling condition with the vehicle stopped or after the high load condition. Therefore, the routine proceeds to a step S32. Here, the hot re-start criterion is set, for example, at about 70 degrees centigrade. The hot re-start criterion can be corrected based on the engine operating conditions, such as the coolant temperature Tw or the air temperature Ta. In this case, as shown in FIG. 6, the hot re-start criterion increases by raising the coolant temperature Tw, or the hot re-start criterion increases by raising the air temperature Ta. By correcting the hot re-start criterion in this manner, the hot re-start condition can be accurately determined. Here, it is noted that the hot re-start criterion is less than the test temperature in the step S22 of FIG. 2.

Figure 7:
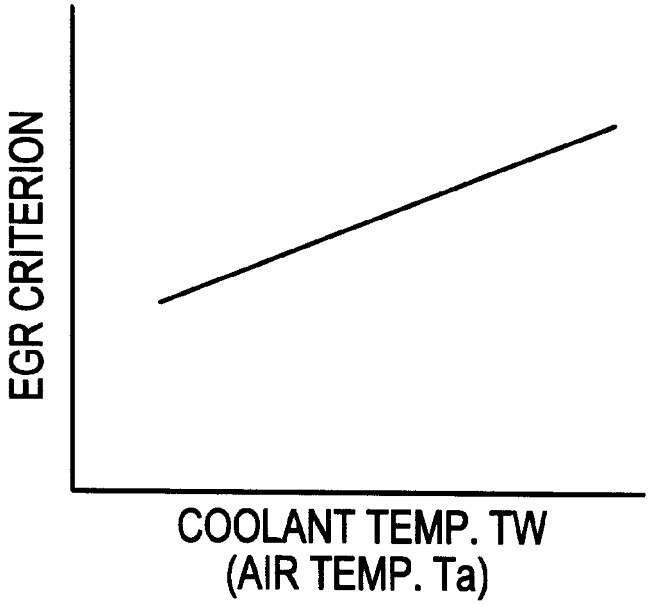
FIG. 7 is a diagram illustrating a EGR criterion in relation to a coolant temperature.

In the step S32, it is determined whether or not a present EGR temperature Tegr is greater than an EGR criterion TEGRNG#. It is noted that the EGR criterion TEGRNG# is less than the hot re-start criterion in the step S31. In this embodiment, the EGR criterion TEGRNG# is set, for example, at about 60 degrees centigrade. The EGR criterion TEGRNG# can be corrected based on the engine operating conditions, such as the coolant temperature Tw or the air temperature Ta. In this case, as shown in FIG. 7, the EGR criterion TEGRNG# increases by raising the coolant temperature Tw, or the hot re-start criterion increases by raising the air temperature Ta. When the present EGR temperature Tegr is greater than the EGR criterion TEGRNG#, the routine proceeds to a step S34.

In the step S34, it is determined whether or not a EGR temperature rising rate delta Tegr, which is defined as a rise in the EGR temperature per unit time, is greater than an EGR rising criterion DTTEGR#. The unit time is set, for example, at about 30 seconds. When the delta Tegr is greater than the EGR rising criterion DTTEGR#, the EGR control valve 28 opens and exhaust gas recirculates through the EGR passage 27. Therefore, the routine proceeds to the step S35, and permits to execute the diagnosis in FIG. 2. At this time, the present EGR temperature Tegr must be greater than the test temperature of the step S22 in FIG. 2. Therefore, it is determined in FIG. 2 that a malfunction has not occurred, and the EGR control valve 28 does not maintain close position. On the other hand, when the delta Tegr is less than or equal to the EGR rising criterion DTTEGR#, the routine returns to the step S32, and waits for the EGR temperature Tegr to be less than the EGR criterion TEGRNG# or the delta Tegr to be greater than the EGR rising criterion DTTEGR#.

In the step S32, when the present EGR temperature Tegr becomes less than or equal to the EGR criterion TEGRNG#, the routine proceeds to a step S33.

In the step S33, while the EGR temperature Tegr is less than or equal to the EGR criterion TEGRNG#, an elapsed time is measured with a timer. Next, it is determined whether or not the elapsed time has exceeded a delay time ETHSJDE#. While the elapsed time has not exceeded the delay time ETHSJDE#, the routine returns to the step S32. Conversely, when the elapsed time has exceeded the delay time ETHSJDE#, it is determined that the EGR temperature Tegr has decreased enough. In other words, misdiagnosis can be prevented because the EGR temperature Tegr is less than the test temperature stably. Therefore, the routine proceeds to the step S35, and permits the execution of the diagnosis in FIG. 2.

Figure 4:
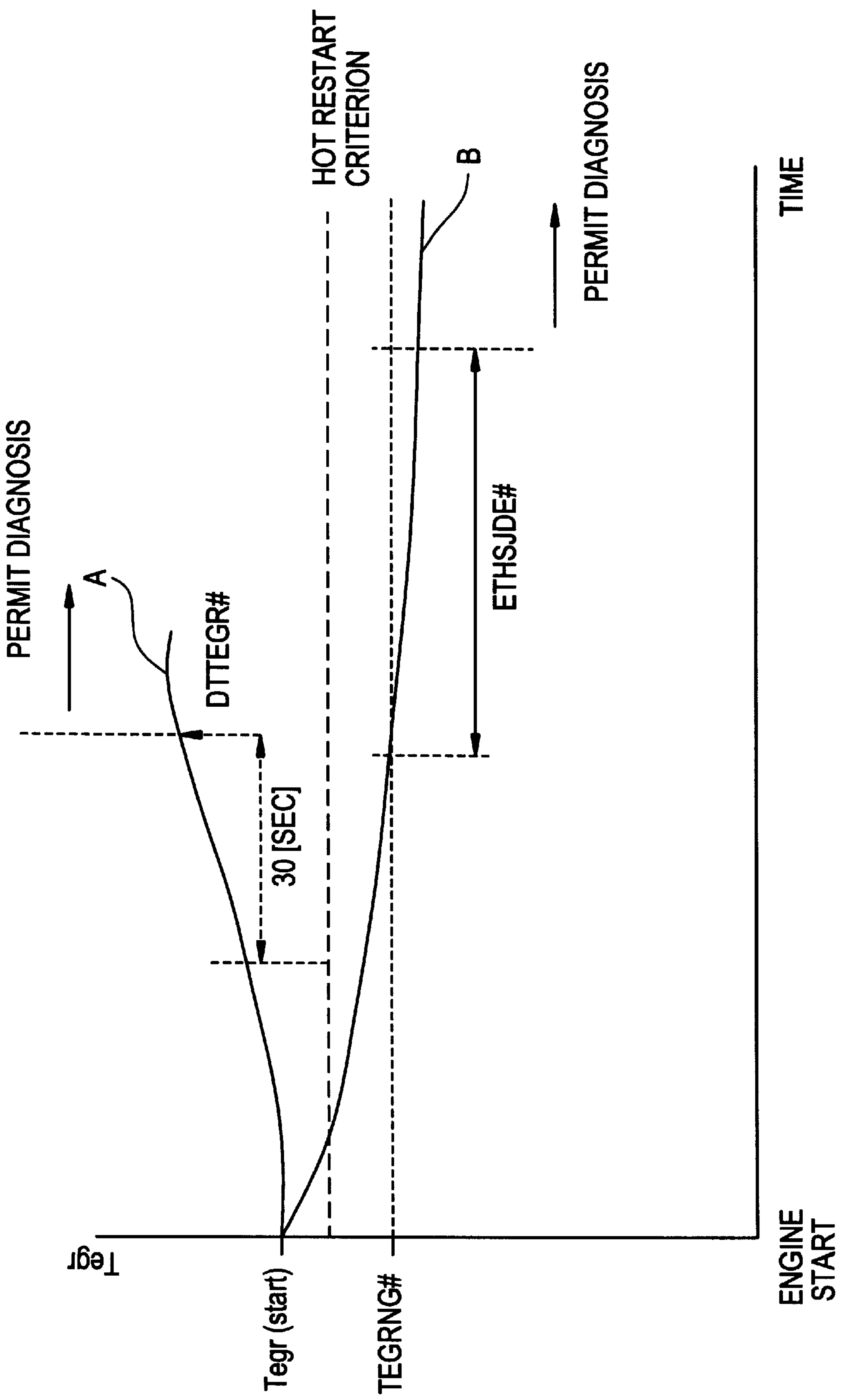
FIG. 4 is a graphical diagram illustrating an EGR temperature with respect to an elapsed time from engine start.

FIG. 4 is a graphical diagram illustrating the EGR temperature with respect to an elapsed time from an engine start. When the engine 10 is re-started in the certain conditions, such as after the idling condition with the vehicle stopped or after high load condition, the temperature in the engine room is high. Therefore, the EGR temperature at engine start Tegr(start) is greater than the hot re-start criterion. In this case, if the engine enters in the exhaust gas recirculation region, the EGR temperature Tegr cannot become less than the EGR criterion TEGRNG# as shown line A. However, if the EGR temperature rising rate delta Tegr becomes greater than the EGR rising criterion DTTEGR#, the diagnosis of the exhaust gas recirculation system is performed immediately. Therefore, the result of the diagnosis can be obtained quickly. On the other hand, if the engine operating condition does not enter in the exhaust gas recirculation region after the engine re-start, the EGR temperature Tegr has decreased below the EGR criterion as shown line B, and the execution of the diagnosis is waiting for elapsing the delay time ETHSJDE#. Therefore, a misdiagnosis is prevented as the exhaust gas recirculation is executed normally, even though the EGR control valve 28 maintains close position and does not work.

Second Embodiment

The second embodiment will be described with reference to the flow diagram of FIG. 5. The basic composition is similar of that as shown in FIGS. 1 and 2.

Figure 5:
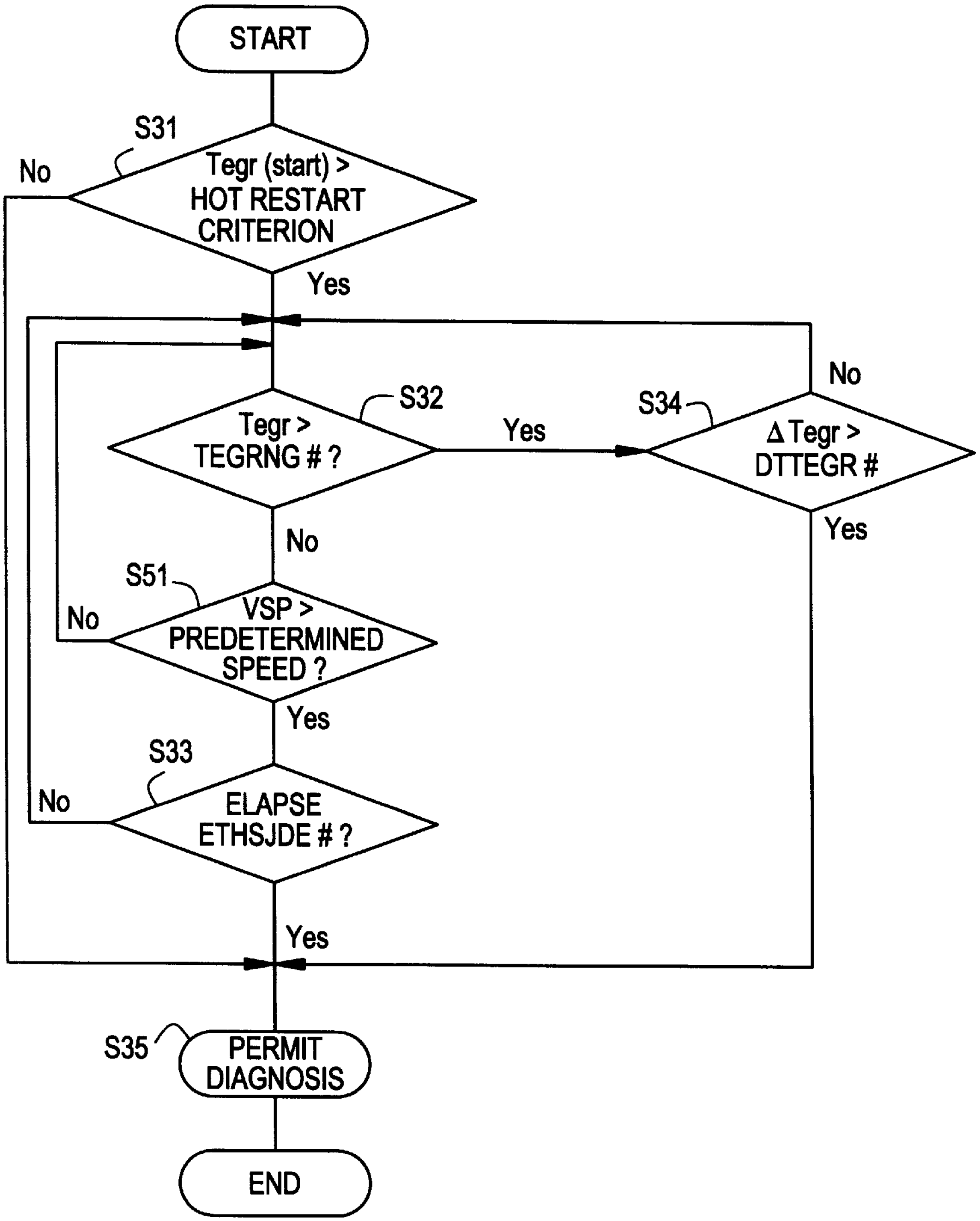
FIG. 5 is a flow diagram used in a second embodiment.

FIG. 5 shows the diagnosis conditions, which determine whether or not to permit the execution of the diagnosis in FIG. 2. A step S51 is added to FIG. 3. The other steps are the same as FIG. 3. Therefore, the other steps are given the same reference characters as in FIG. 3, and the explanation is not repeated for the sake of brevity and clarity.

In a step S32, it is determined whether or not the present EGR temperature Tegr is greater than the EGR criterion TEGRNG#. When the present EGR temperature Tegr becomes less than or equal to the EGR criterion TEGRNG#, the routine proceeds to a step S51.

In the step S51, it is determined whether or not the vehicle speed VSP is greater than a predetermined speed. When the vehicle speed VSP is less than or equal to the predetermined speed, the routine returns to the step S32. Conversely, when the vehicle speed VSP is greater than the predetermined speed, the routine proceeds to the step S33.

In the step S33, an elapsed time, while the EGR temperature Tegr is less than or equal to the EGR criterion TEGRNG# and the vehicle speed VSP is greater than the predetermined speed, is measured with the timer. Also, it is also determined whether or not the elapsed time has exceeded a delay time ETHSJDE#. While the elapsed time has not exceeded the predetermined time, the routine returns to the step S32. Conversely, when the elapsed time has exceeded the delay time ETHSJDE#, the routine proceeds to the step S35, and permits the diagnosis in FIG. 2.

In this manner, since the diagnosis is permitted when the vehicle speed VSP is higher than the predetermined speed for the delay time, the EGR temperature Tegr has decreased enough because plenty of air flow comes into the engine room. Therefore, misdiagnosis can be prevented as the exhaust gas recirculation is executed normally, even though the EGR control valve 28 maintains close position and does not work.

The foregoing invention has been described in terms of preferred embodiments. However, those skilled in the art will recognize that many variations of such embodiments exists. Such variations are intended to be within the spirit and scope of the present invention and the appended claims.

What is claimed is:

1. A diagnostic device for an exhaust gas recirculation system of an engine, comprising:

an EGR passage, wherein the EGR passage recirculates exhaust gas from an exhaust passage to an intake passage;

an EGR control valve disposed in the EGR passage;

an EGR temperature sensor, disposed in the EGR passage, to detect a temperature; and a controller, wherein the controller comprises:

a control section generating an operating signal to control the EGR control valve;

a calculation section to calculate a rising rate of the temperature;

a diagnostic execution section to execute a diagnosis of the exhaust gas recirculation system based on the temperature and the operating signal when the temperature is less than or equal to a predetermined temperature; and a permission section to permit execution of the diagnosis when the rising rate of the temperature is greater than a predetermined value even when the temperature is greater than the predetermined temperature.

2. A diagnostic device as set forth in claim 1, wherein the diagnosis determines a malfunction, when the temperature is less than a test temperature though the operating signal to open the EGR control valve is generated.

3. A diagnostic device as set forth in claim 2, wherein the diagnostic execution section executes the diagnosis when the temperature is less than or equal to a predetermined temperature for a predetermined time.

4. A diagnostic device as set forth in claim 3, further comprising a vehicle speed sensor to detect a vehicle speed, and wherein the diagnostic execution section executes the diagnosis when the vehicle speed is greater than a predetermined speed.

5. A diagnostic device for an exhaust gas recirculation system of an engine, comprising:

an EGR passage, wherein the EGR passage recirculates exhaust gas from an exhaust passage to an intake passage;

an EGR control valve disposed in the EGR passage;

an EGR temperature sensor, disposed in the EGR passage, to detect a temperature; and a controller, wherein the controller comprises:

a control section generating an operating signal to control the EGR control valve;

a calculation section to calculate a rising rate of the temperature when the temperature at the engine start is greater than a first predetermined temperature;

a diagnostic execution section to execute a diagnosis of an exhaust gas recirculation system based on the temperature and the operating signal, wherein the diagnosis is prevented when the temperature is greater than a second predetermined temperature, and when the temperature at the engine start is greater than the first predetermined temperature, and wherein the first predetermined temperature is greater than the second predetermined temperature; and a permission section to permit execution of the diagnosis when the rising rate of the temperature is greater than a predetermined value even when the temperature is greater than the second predetermined temperature.

6. A diagnostic device as set forth in claim 5, wherein the diagnosis determines a malfunction, when the temperature is less than a test temperature though the operating signal to open the EGR control valve is generated.

7. A diagnostic device as set forth in claim 6, wherein the test temperature is greater than the first predetermined temperature.

8. A diagnostic device as set forth in claim 7, wherein the diagnostic execution section prevents the diagnosis until a predetermined time elapses when the temperature is less than or equal to the second predetermined temperature.

9. A diagnostic device as set forth in claim 7, further comprising a vehicle speed sensor to detect a vehicle speed, and wherein the diagnostic execution section executes the diagnosis when the vehicle speed is greater than a predetermined speed.

10. A diagnostic device as set forth in claim 7, further comprising a coolant temperature sensor to detect a coolant temperature of the engine, wherein the first predetermined temperature is calculated based on the coolant temperature.

11. A diagnostic device as set forth in claim 7, further comprising an atmospheric temperature sensor to detect an air temperature, wherein the first predetermined temperature is calculated based on the air temperature.

12. A diagnostic device as set forth in claim 7, further comprising a coolant temperature sensor to detect a coolant temperature of the engine, wherein the second predetermined temperature is calculated based on the coolant temperature.

13. A diagnostic device as set forth in claim 7, further comprising an atmospheric temperature sensor to detect an air temperature, wherein the second predetermined temperature is calculated based on the air temperature.

14. A diagnostic device for an exhaust gas recirculation system of an engine, comprising:

an EGR passage, wherein the EGR passage recirculates exhaust gas from an exhaust passage to an intake passage;

an EGR control valve disposed in the EGR passage;

an EGR temperature sensor, disposed in the EGR passage, to detect a temperature;

control means for generating an operating signal to control the EGR control valve;

calculate means for calculating a rising rate of the temperature when the temperature at the engine start is greater than a first predetermined temperature;

diagnostic execution means for executing a diagnosis of an exhaust gas recirculation system based on the temperature and the operating signal, wherein the diagnosis is prevented when the temperature is greater than a second predetermined temperature, and when the temperature at the engine start is greater than the first predetermined temperature, and wherein the first predetermined temperature is greater than the second predetermined temperature; and permission means for permitting an execution of the diagnosis when the rising rate of the temperature is greater than a predetermined value even when the temperature is greater than the second predetermined temperature.

15. A diagnostic device as set forth in claim 14, wherein the diagnosis determines a malfunction when the temperature is less than a test temperature though the operating signal to open the EGR control valve is generated.

16. A diagnostic device as set forth in claim 15, wherein the test temperature is greater than the first predetermined temperature.

17. A method for diagnosis of an exhaust gas recirculation system of an engine, comprising:

detecting a temperature in an EGR passage;

generating an operating signal to control an EGR control valve;

calculating a rising rate of the temperature when the temperature at the engine start is greater than a first predetermined temperature;

executing a diagnosis of an exhaust gas recirculation system based on the temperature and the operating signal, wherein the diagnosis is prevented when the temperature is greater than a second predetermined temperature, and when the temperature at the engine start is greater than the first predetermined temperature, and wherein the first predetermined temperature is greater than the second predetermined temperature; and permitting an execution of the diagnosis when the rising rate of the temperature is greater than a predetermined value even when the temperature is greater than the second predetermined temperature.

* * * * *